United States Patent
Song et al.

(10) Patent No.: US 11,288,492 B2
(45) Date of Patent: Mar. 29, 2022

(54) METHOD AND DEVICE FOR ACQUIRING 3D INFORMATION OF OBJECT

(71) Applicant: BEIJING BAIDU NETCOM SCIENCE AND TECHNOLOGY CO., LTD., Beijing (CN)

(72) Inventors: Xibin Song, Beijing (CN); Ruigang Yang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 118 days.

(21) Appl. No.: 16/773,286

(22) Filed: Jan. 27, 2020

(65) Prior Publication Data
US 2020/0242331 A1 Jul. 30, 2020

(30) Foreign Application Priority Data

Jan. 28, 2019 (CN) .......................... 201910077895.1

(51) Int. Cl.
*G06K 9/00* (2022.01)
*G06T 7/73* (2017.01)
*G06T 7/55* (2017.01)

(52) U.S. Cl.
CPC ..... *G06K 9/00208* (2013.01); *G06K 9/00791* (2013.01); *G06T 7/55* (2017.01); *G06T 7/75* (2017.01); *G06T 2207/30252* (2013.01)

(58) Field of Classification Search
CPC .. G06K 9/00208; G06K 9/00791; G06T 7/75; G06T 7/55; G06T 2207/30252; G06T 2207/30248
See application file for complete search history.

(56) References Cited

U.S. PATENT DOCUMENTS

2004/0190775 A1\* 9/2004 Miller .................. G06K 9/6255
382/190
2015/0178927 A1 6/2015 Olszamowski
(Continued)

FOREIGN PATENT DOCUMENTS

CN      1136685 A      11/1996
CN      1261969 A      8/2000
(Continued)

OTHER PUBLICATIONS

Collet, A., Berenson, D., Srinivasa, S.S. and Ferguson, D., 2009, May. Object recognition and full pose registration from a single image for robotic manipulation. In 2009 IEEE International Conference on Robotics and Automation (pp. 48-55). IEEE.\*

(Continued)

*Primary Examiner* — Zhitong Chen
(74) *Attorney, Agent, or Firm* — Lathrop GPM LLP (57) ABSTRACT

The present disclosure provides a method and device for acquiring 3D information of an object. The method includes: extracting two-dimensional (2D) key points of the object based on the image, and determining a candidate 3D model set matching the image; determining a plurality of first reference attitudes and positions of each candidate 3D model according to the 3D key points and the 2D key points; acquiring a plurality of reprojection error values between each candidate 3D model and the object at the plurality of first reference attitudes and positions; determining a first target attitude and position and a first target 3D model corresponding to a minimum reprojection error value in the first reprojection error value set; and acquiring the 3D information of the object based on the first target attitude and position and the first target 3D model.

13 Claims, 7 Drawing Sheets

(56) References Cited

U.S. PATENT DOCUMENTS

2015/0371391 A1* 12/2015 Ding .................. G06T 7/187 382/141
2018/0137366 A1 5/2018 Szeto et al.

FOREIGN PATENT DOCUMENTS

| | | | |
|---|---|---|---|
| CN | 1980322 | A | 6/2007 |
| CN | 102592117 | A | 7/2012 |
| CN | 103578133 | A | 2/2014 |
| CN | 105096376 | A | 11/2015 |
| CN | 105096386 | A | 11/2015 |
| CN | 105141942 | A | 12/2015 |
| CN | 106688017 | A | 5/2017 |
| CN | 107852533 | A | 3/2018 |
| CN | 108028871 | A | 5/2018 |
| CN | 108509848 | A | 9/2018 |
| CN | 108519215 | A | 9/2018 |
| CN | 109087344 | A | 12/2018 |
| CN | 109146935 | A | 1/2019 |

OTHER PUBLICATIONS

Chinese Patent Application No. 201910077895.1 First Office Action dated Jun. 10, 2020, 10 pages.
Chinese Patent Application No. 201910077895.1 English translation of First Office Action dated Jun. 10, 2020, 8 pages.
Li, Z., et al., "An Optimal Projection Plane-Based Spatial Circle Measurement Method Using Stereo Vision System"; vol. 32, No. 1; Jan. 2019; pp. 58-66.
Zamboj, M., "Double Orthogonal Projection of Four-Dimensional Objects Onto Two Perpendicular Three-Dimensional Spaces"; Nexus Network Journal; published Jan. 16, 2018; 15 pages.
Chinese Patent Application No. 201910077895.1 Second Office Action dated Jan. 19, 2021, 8 pages.
Chinese Patent Application No. 201910077895.1 English translation of Second Office Action dated Jan. 19, 2021, 9 pages.

* cited by examiner

METHOD AND DEVICE FOR ACQUIRING 3D INFORMATION OF OBJECT

CROSS-REFERENCE TO RELATED APPLICATIONS

This application claims priority to and benefits of Chinese Patent Application No. 201910077895.1, filed with the National Intellectual Property Administration of P. R. China on Jan. 28, 2019, the entire contents of which are incorporated herein by reference.

TECHNICAL FIELD

The present disclosure relates to the field of three-dimensional (3D) information technology, and more particularly, to a method and a device for acquiring 3D information of an object.

BACKGROUND

The acquisition of 3D information of an object, especially a dynamic object, can be challenging. Since the 3D information of the object can provide constraints complementary to color information, and reflect the distance between the object and the camera, the acquisition of 3D information of the object receives more attention in the field of artificial intelligence.

SUMMARY

Embodiments of a first aspect of the present disclosure provide a method for acquiring 3D information of an object. The method includes: acquiring an image including an object to be recognized, extracting two-dimensional (2D) key points of the object based on the image, and determining a candidate 3D model set matching the image; for each candidate 3D model in the candidate 3D model set, determining 3D key points matching the 2D key points, and determining a plurality of first reference attitudes and positions of each candidate 3D model according to the 3D key points and the 2D key points; acquiring a plurality of reprojection error values between each candidate 3D model and the object at the plurality of first reference attitudes and positions, and determining a first reprojection error value set corresponding to the candidate 3D model set; determining a first target attitude and position and a first target 3D model corresponding to a minimum reprojection error value in the first reprojection error value set; and acquiring the 3D information of the object based on the first target attitude and position and the first target 3D model.

Embodiments of the present disclosure provide a computer device including a memory, a processor, and a computer program stored on the memory and executable by the processor.

When the computer program is executed by the processor, the method for acquiring 3D information of an object according to embodiments of the present disclosure is implemented.

Embodiments of the present disclosure provide a non-transitory computer readable storage medium having a computer program stored thereon. When the computer program is executed by a processor, the method for acquiring 3D information of an object according to embodiments of the present disclosure is implemented.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Embodiments of the present disclosure will be described in detail, and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

In the related art, a color image and an auxiliary depth image of an object are used to estimate the 3D information of the object in the image, the color image and the depth image of the object are acquired, and the 3D information of the object is estimated based on the color image and the auxiliary depth image, and 3D information of the object is acquired in the two-dimensional (2D) image. However, in this manner of acquiring the depth information, due to large amount of calculation of depth information, the angle for acquiring the depth information is generally low, and the auxiliary depth image is often of poor quality, there are a lot of defects, and it is susceptible to ambient light and other factors, the accuracy of the image is difficult to guarantee, the accuracy of the 3D information acquired of the object is low, and the robustness is poor.

A method and a device for acquiring 3D information of an object will be described below with reference to the accompanying drawing. The method and the device for acquiring 3D information of an object according to embodiments of the present disclosure may be applied to scenes for acquiring 3D information of moving objects and non-moving objects, for example, may be applied to the field of autonomous vehicle perception. Based on the sensed 3D information of the vehicle, training data sets can be provided, and the accuracy and robustness of the perception algorithm of the autonomous vehicle can be improved.

In the related art, the accuracy of 3D information acquisition of the object is not high, and the robustness is poor, the present disclosure provides a method for acquiring 3D information of an object in a 2D image. With the method, by matching 2D key points of the object in the image with the corresponding 3D key points in a preset 3D model, the relative position relationship (such as the attitude relationship) between the 3D model and the 2D object in the image can be calculated, and 3D information of the object in the 2D image can be obtained. The 3D information may include information such as depth information of the object in the 2D image, the corresponding attitude, and the 2D and 3D bounding boxes of the object.

Figure 1:
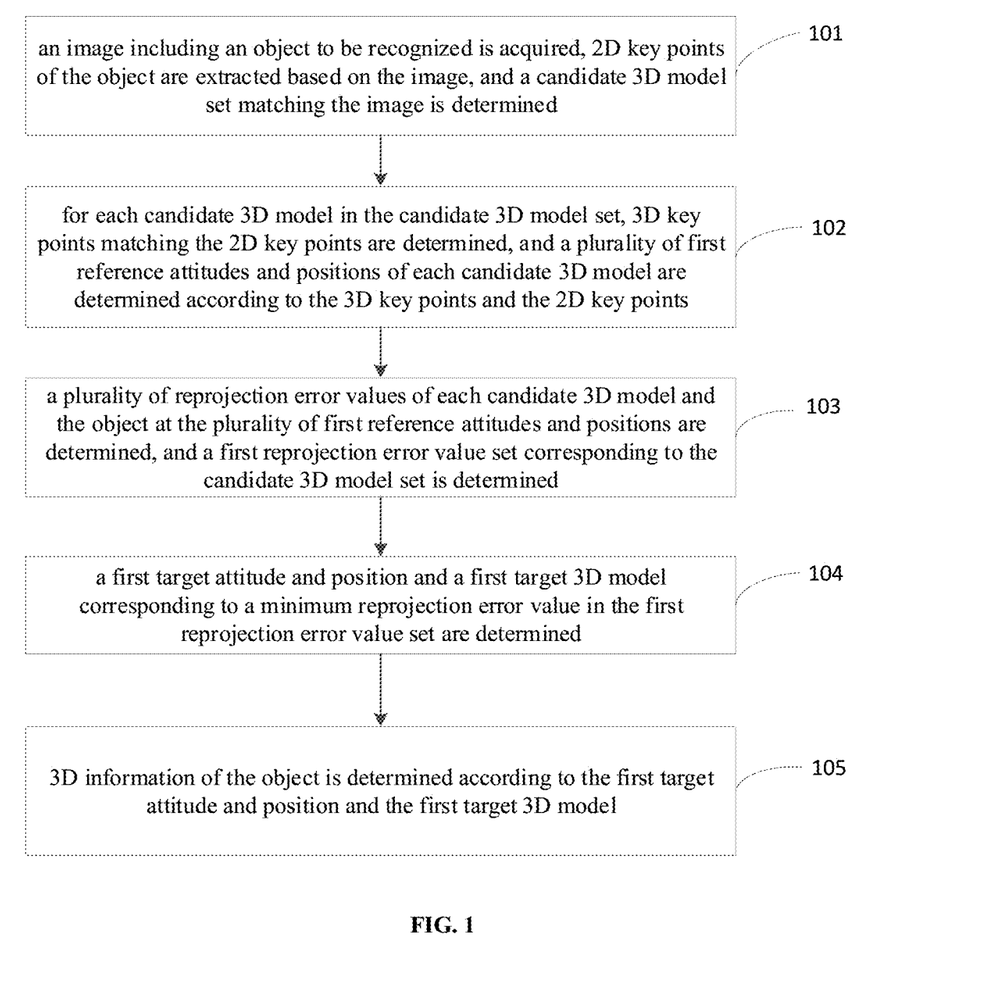
FIG. 1 is a flowchart of a method for acquiring 3D information of an object according to some embodiments of the present disclosure.

FIG. 1 is a flowchart of a method for acquiring 3D information of an object according to some embodiments of the present disclosure. As illustrated in FIG. 1, the method may include the following steps.

At block 101, an image including an object to be recognized is acquired, 2D key points of the object are extracted based on the image, and a candidate 3D model set matching the image is determined.

The image including the object to be recognized may be an image or a plurality of images of the same object simultaneously captured by a camera module. There may be one or more objects to be recognized in the image. In addition, in order to improve the efficiency of acquiring 3D information, the key points mentioned in some embodiments of the present disclosure may include points having semantic information. For example, when the object is a vehicle, the key points may correspond to four corner points of a license plate, tire center points, and door handle points.

Specifically, 2D key points of the object are extracted, and a candidate 3D model set matching the image is determined. The candidate 3D model set may include a plurality of candidate 3D models that match the image. For example, when the current image is a vehicle image, the candidate 3D model set may include a plurality of 3D vehicle models. In different application scenarios, the methods for acquiring the candidate 3D model sets may be different. In an implementation manner, object identifiers corresponding to the 3D models may be prestored in the 3D model database, and the object identifier in the image may be extracted. The object identifier may generally correspond to the uniqueness of the object. For example, for a vehicle, the object identifier may include model information, or shape information of the vehicle. In another implementation manner, candidate 3D key point information in the 3D model may be pre-marked, the candidate 3D key point information may correspond to the 2D key points, and include key points with semantic information. Thus, after the 2D key points are identified, the 3D models including the same semantic may be matched as candidate 3D models based on the semantics of the pre-marked 2D key points. For example, when the identified key points are a vehicle handle, all 3D models including the 3D key points of the vehicle handle may be taken as candidate 3D models, and the plurality of candidate 3D models satisfying a condition may form the candidate 3D model set.

Figure 2:
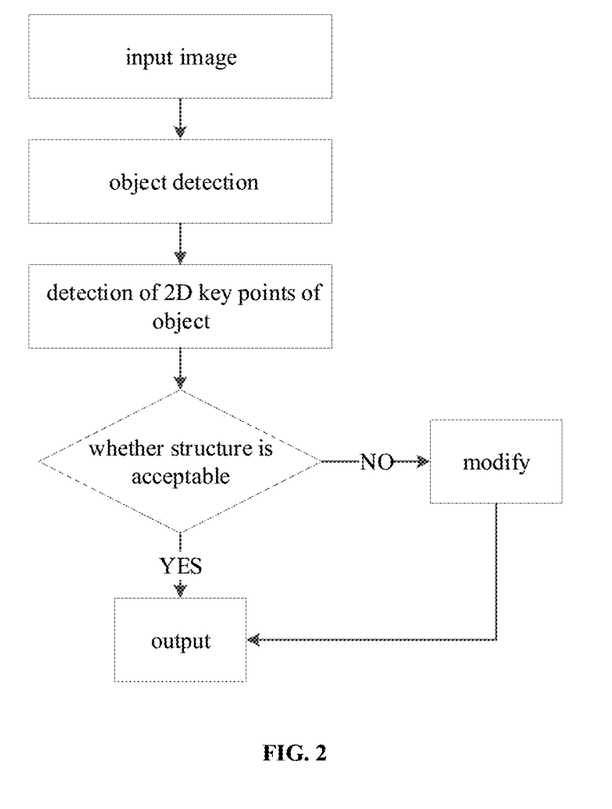
FIG. 2 is a flowchart of a method for acquiring 2D key points according to some embodiments of the present disclosure.

Depending on different application scenarios, the method for extracting 2D key points of the object in the image may be different. In an example, FIG. 2 is a flowchart of a method for acquiring 2D key points according to some embodiments of the present disclosure, as illustrated in FIG. 2, the position and the mask of the object in the input image may be obtained based on an object detection algorithm, and a sub-image corresponding to the object may be acquired according to the mask, and 2D key points may be detected by using a 2D key point detection method. The 2D key point detection method takes the image of each 2D object as an input, to obtain the positions of the observable 2D key points. Certainly, in order to avoid the error in the model output, the user may finally check the accuracy of the 2D key points detected, and eliminate the detection errors. In another implementation, the 2D key points may be manually marked.

At block 102, for each candidate 3D model in the candidate 3D model set, 3D key points matching the 2D key points are determined, and a plurality of first reference attitudes and positions of each candidate 3D model are determined according to the 3D key points and the 2D key points.

As described above, the 3D key points of each candidate 3D model that match the 2D key points may be determined based on semantic information of the pre-marked key points. Certainly, the 3D key points that match the 2D key points may also be recognized based on the image features. For example, when the 2D key points are the corner position of the vehicle lamp, and the 3D key points that match the corner position of the vehicle lamp may be recognized based on the model features of the 3D model.

Certainly, in order to improve the efficiency of determining the 3D key points, in an embodiment of the present disclosure, the 3D key points in the 3D model may be marked in advance. For different objects, different numbers of key points may be marked according to the structural complexity.

Furthermore, a plurality of first reference attitudes and positions of each candidate model may be determined according to the 3D key points and the 2D key points. In an example, the possible relative position relationship (such as parameters having 6 freedom degrees) between the 3D model and the 2D object may be solved by a PnP algorithm according to the 2D key points and the corresponding 3D key points of the 3D model, and the plurality of first reference attitudes and positions may be determined based on the possible relative position relationship.

At block 103, a plurality of reprojection error values of each candidate 3D model and the object at the plurality of first reference attitudes and positions are determined, and a first reprojection error value set corresponding to the candidate 3D model set is determined.

At block 104, a first target attitude and position and a first target 3D model corresponding to a minimum reprojection error value in the first reprojection error value set are determined.

When the attitude and position of the candidate 3D model closely matches the 3D information of the object, the reprojection error value between the candidate 3D model and the object may be small. In the embodiment, a plurality of reprojection error values of each candidate 3D models and the object at the plurality of corresponding first reference attitudes and positions may be acquired, the first reprojection error value set including a plurality of reprojection error values may be generated, and the first target attitude and position and the first target 3D model corresponding to the minimum reprojection error value in the first reprojection error value set may be determined.

At block 105, 3D information of the object is determined according to the first target attitude and position and the first target 3D model.

Specifically, after the first target attitude and position and the first target 3D model are determined, the 3D information of the object may be acquired based on the first target attitude and position and the first target 3D model. The 3D information may include depth information of the object, the attitude (including the rotation angle and translation parameter) of the first target 3D model, and corresponding 2D and 3D bounding boxes.

In the actual practice, for an object with a large number of observable 2D key points in the image, the relative position relationship between the 2D object and the 3D model can be directly calculated by the matching between the 2D key points and the 3D key points, and the 3D information of the object can be obtained. For an object with a small number of observable key points in the image, there are fewer constraints, and the 3D information obtained by the above manner may have poor accuracy. In an embodiment of the present disclosure, before the plurality of first reference attitudes and positions of each candidate 3D model are determined according to the 3D key points and the 2D key points, it is determined that the 2D key points satisfy a preset sufficient constraint. The preset sufficient constraint is configured to determine the difficulty of solving the 3D information of the object according to the current 2D key point information and the candidate 3D model. In different scenarios, the preset sufficient constraints may be different. In an implementation manner, in determining whether the 2D key points satisfy the preset sufficient constraint, it may be determined whether the 2D key points are on the same face of the object. For example, the positions of the faces to which different 2D key points belong may be marked in advance, and it may be determined whether the 2D key points are on the same face of the object based on 2D key points and the positions of the faces to which different 2D key points belong.

In other words, based on the preset sufficient constraint, it is determined whether the 3D information can be accurately solved based on the current 2D key points, when the 3D information can be accurately solved, the 3D model of the object is obtained by the above method, and when the 3D information cannot be accurately solved, ground constraints are applied in the present disclosure. The 3D object model may only move and rotate along the ground, and the ground constraint may be obtained based on the attitude relationship with the 3D model obtained by the reference object with many observable 2D key points in the scene, the freedom degree of the attitude parameters of the 3D object model to be solved can be greatly reduced, the freedom degree of the parameters can be reduced from 6 to 3, thereby effectively estimating the 3D information of the object in the 2D image, and improving the robustness and accuracy of acquiring the 3D information.

Figure 3:
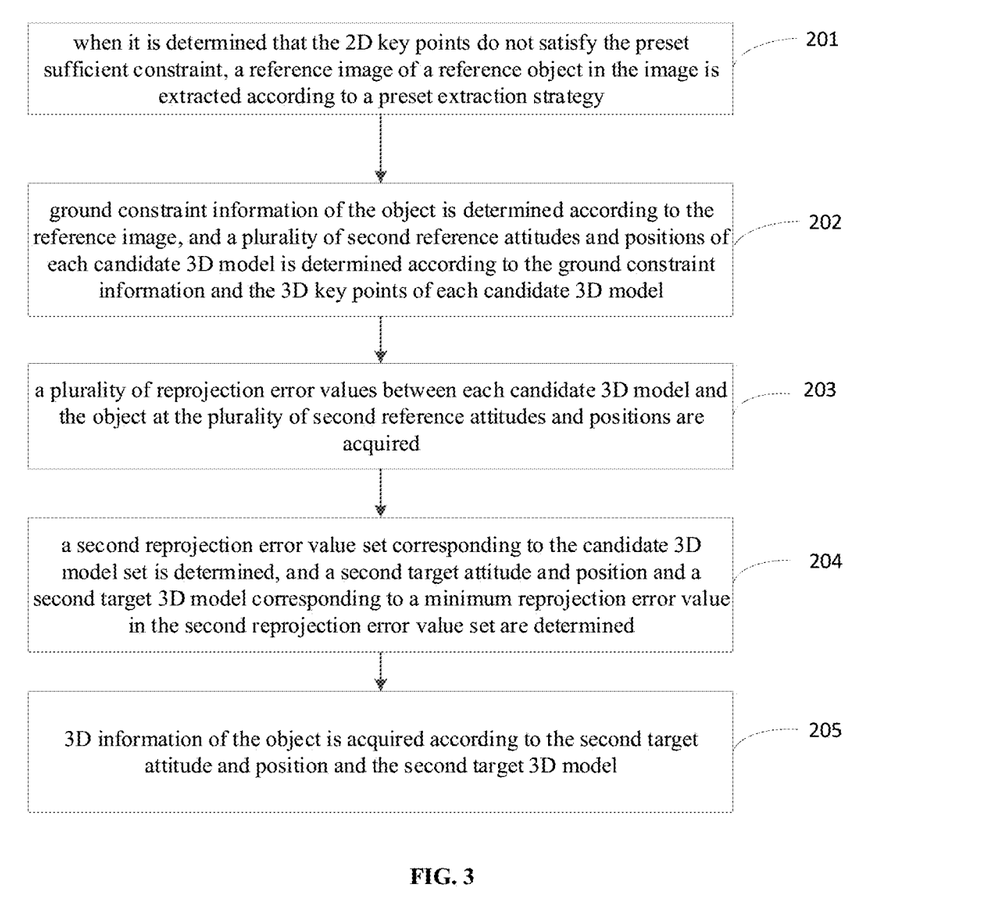
FIG. 3 is a flowchart of a method for acquiring 3D information of an object according to some embodiments of the present disclosure.

In an embodiment of the present disclosure, FIG. 3 is a flowchart of a method for acquiring 3D information of an object according to some embodiments of the present disclosure, as illustrated in FIG. 3, before determining the plurality of first reference attitudes and positions of each candidate 3D model according to the 3D key points and the 2D key points, the method further includes the following steps.

At block 201, when it is determined that the 2D key points do not satisfy the preset sufficient constraint, a reference image of a reference object in the image is extracted according to a preset extraction strategy.

Due to environmental factors such as illumination or occlusion, it may be difficult to guarantee the number of 2D key points detectable in the object. When there are a relatively large number of 2D key points and the acquired 2D key points are distributed in at least two faces of the object, it is considered that constraint for the object is sufficient, and the 3D information of the object can be accurately solved based on the target model and the current 2D image information. Conversely, when there are a relatively small number of 2D key points acquired and the 2D key points are distributed on one face of the object, it is considered that the constraint for the object is insufficient, when the 3D information of the object is solved based on the target model and the current 2D image information, there may be many parameters to be solved, and it may be difficult to solve the corresponding 3D information. In other words, when the constraint is insufficient, there may be multiple solutions, and when the detected observable 2D key points and the corresponding 3D key points of the candidate 3D model are directly used for solving the attitude relationship, the attitude relationship may fail to be solved.

Therefore, in some embodiments of the present disclosure, before determining the 3D information, it may be determined whether the 2D key points satisfy the preset sufficient constraint. When it is determined that the 2D key points do not satisfy the preset sufficient constraint, the reference image of the object in the image may be extracted according to the preset extraction strategy, so as to derive parameter information of the object in the image according to the reference image, and reduce the number of parameters to be solved when acquiring the 3D information of the object in the image.

In different scenarios, the preset extraction strategy may be different. In an implementation manner, as an example, the preset sufficient constraint is to determine whether the 2D key points are on the same face of the object, when the 2D key points are on the same face of the object, a candidate reference images of each of a plurality of candidate reference objects (i.e., the images of other objects in the image are recognized) in the image may be recognized, 2D key points of each of the plurality of candidate reference images may be recognized, and the candidate reference object whose 2D key points are not on the same face of the candidate reference object may be determined as the reference object. In other words, the reference images of other sufficiently constrained reference objects in the image are determined, so as to solve the parameters required for acquiring 3D information based on the reference images of the reference objects.

In actual practice, there may be a plurality of reference objects that are sufficiently constrained, in order to improve the accuracy of determining the 3D information of the object, the reference object closest to the object in the plurality of sufficiently constrained reference objects may be selected as the final reference object, to reduce the error of determining relevant parameters.

In the embodiment, a plurality of 2D key points corresponding to each of the plurality of reference objects may be acquired, and an average value of 2D key points corresponding to each reference object is calculated to obtain a reference center point of each of the plurality of reference objects, an average value of 2D key points of the object is calculated, a center point of the object is acquired, an absolute value of a distance between the center point of the object and the reference center point of each reference object is calculated to obtain a plurality of absolute values, and the plurality of absolute values are compared, and a target reference object corresponding to the minimum absolute value is determined, and the reference image corresponding to the target reference object is extracted as the final reference image.

At block 202, ground constraint information of the object is determined according to the reference image, and a plurality of second reference attitudes and positions of each candidate 3D model is determined according to the ground constraint information and the 3D key points of each candidate 3D model.

Specifically, the 3D object may have six degrees of motion freedom in space, including the rotation along three axes of the world coordinate system (rotational freedom degrees) and translation along three axes of the world coordinate system (translational freedom degrees). With the control of parameters of 6 degrees of freedom (translation and rotation model), the model can be rotated and translated to a proper position. Through projection imaging of the camera, the matching of the 3D model with the corresponding object in the 2D image can be completed. The 6 parameters are the relative position relationship (i.e., the attitude of the object) between the 3D model and the current camera. Since the object and the reference object in the image are on the same ground, due to the ground constraint, the translation and rotation of the 3D model can only be on the ground, thereby reducing the freedom degrees of motion parameters of the 3D model in space. Since the 3D model can only rotate along the normal direction of the ground, the rotation parameter can be reduced from 3 to 1, and since the 3D model can only move on the ground, the translation parameter can be reduced from 3 to 2.

In some embodiments of the present disclosure, the ground constraint information of the object may be determined according to the reference image. The ground constraint information includes the height of the ground (i.e., the height of the normal vector in the attitude of the 3D model), the height of each candidate 3D model may be determined according to the ground constraint information. Based on the correspondence between the 2D key points and the 3D key points, the position of each candidate 3D model can be estimated. After the position is determined, since each candidate 3D model may have multiple normal rotation angles at each estimated position, a plurality of second reference attitudes and positions of each candidate 3D model can be determined according to different normal rotation angles at each estimated position.

Figure 4:
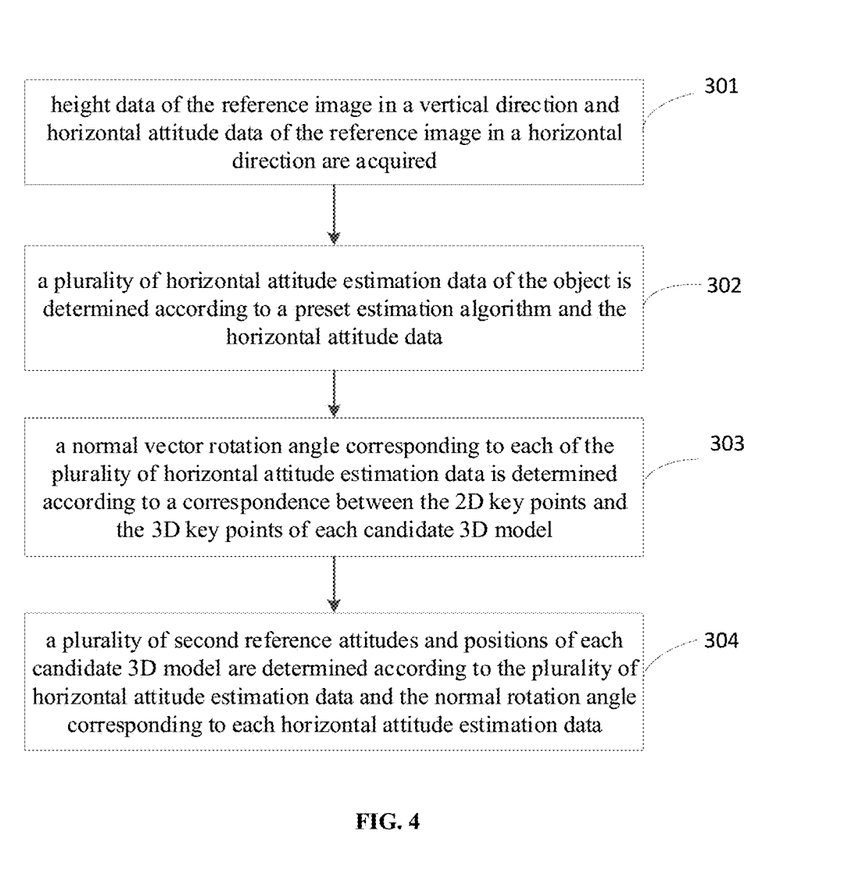
FIG. 4 is a flowchart of a method for acquiring 3D information of an object according to some embodiments of the present disclosure.

In different application scenarios, the manner for obtaining the second reference attitude and position may be different. In an implementation manner, FIG. 4 is a flowchart of a method for acquiring 3D information of an object according to some embodiments of the present disclosure, as illustrated in FIG. 4, block 202 may include the following steps.

At block 301, height data of the reference image in a vertical direction and horizontal attitude data of the reference image in a horizontal direction are acquired.

The reference 3D model corresponding to the reference image may be recognized, and the optimal attitude and position of the reference 3D model may be determined based on the reprojection error value between the 3D model of the reference image and the reference image, and based on the optimal attitude and position, the height data of the ground where the reference image is located may be determined, and the horizontal attitude data such as X-axis data and Y-axis data in the horizontal direction may be determined.

At block 302, a plurality of horizontal attitude estimation data of the object is determined according to a preset estimation algorithm and the horizontal attitude data.

It should be understood that, the reference image is on the same ground as the object, the horizontal attitude data has certain estimable properties, and a plurality of horizontal attitude estimation data of the object may be determined according to the preset estimation algorithm and the horizontal attitude data, including X-axis data and Y-axis data of the object.

In the embodiment, first location information of the reference image and second location information of the image may be acquired, for example, the center coordinate of the reference image and the center coordinate of the image are acquired. A search direction may be determined according to the first location information and the second location information, for example, the search direction may be determined according to the coordinate difference between the two center coordinates. Further, the plurality of horizontal attitude estimation data may be determined by taking the horizontal attitude data as an initial value, and an estimation may be performed along the search direction according to a least square algorithm. In an example, the coordinate axes of space include X axis, Y axis and Z axis, the X axis and the Y axis represent the ground coordinate axis, and the Z axis represents the ground height, the grid coordinates may be set along the X axis and Y axis according to the search direction. Each grid coordinate may be the initial value of the X axis and Y axis in the least square optimization algorithm. Each initial value may be understood as the horizontal attitude estimation value of the object. Because all the objects in the image are on the same face, the initial value of the Z axis may be set as the value of the Z direction (ground height value) in the relative position relationship.

At block 303, a normal vector rotation angle corresponding to each of the plurality of horizontal attitude estimation data is determined according to a correspondence between the 2D key points and the 3D key points of each candidate 3D model.

The object can only move on the ground, in the embodiment of the present disclosure, since the ground height is determined, it only needs to set the initial value of the normal rotation angle along the ground. Based on the horizontal attitude data and the correspondence between the 2D information and the 3D information, the relative position relationship of the object and each candidate 3D model can be determined, and the rotation angle may be estimated according to the relative position relationship. The angle may range from −180 degrees to 180 degrees. Certainly, in order to improve the efficiency of determining 3D information of the object, an interval angle beta may be set, for example, beta may range from 0 to 180 degrees, and the ground rotation angle corresponding to each second reference attitude and position may be determined based on the interval value.

At block 304, a plurality of second reference attitudes and positions of each candidate 3D model are determined according to the plurality of horizontal attitude estimation data and the normal rotation angle corresponding to each horizontal attitude estimation data.

Specifically, after the plurality of horizontal attitude estimation data is determined, the plurality of second reference attitudes and positions of each candidate 3D model may be determined according to the plurality of horizontal attitude estimation data and the normal rotation angle corresponding to each horizontal attitude estimation data.

At block 203, a plurality of reprojection error values between each candidate 3D model and the object at the plurality of second reference attitudes and positions are acquired.

At block 204, a second reprojection error value set corresponding to the candidate 3D model set is determined, and a second target attitude and position and a second target 3D model corresponding to a minimum reprojection error value in the second reprojection error value set are determined.

Specifically, when the attitude and position of the candidate 3D model are close to the 3D information of the object, the reprojection error value between the candidate 3D model and the object may be small. In the embodiment, a plurality of reprojection error values between each candidate 3D model and the object at the plurality of second reference attitudes and positions may be acquired, and the second reprojection error value set including a plurality of reprojection error values may be determined, and the second target attitude and position and the second target 3D model corresponding to the minimum reprojection error value in the second reprojection error value set may be determined.

In an embodiment of the present disclosure, the normal rotation angle of each candidate reference 3D model at each of the plurality of second reference attitudes and positions may be determined, and the reprojection error value between each candidate 3D model and the object at the normal rotation angle may be acquired.

At block 205, 3D information of the object is acquired according to the second target attitude and position and the second target 3D model.

Specifically, after the second target attitude and position and the second target 3D model are determined, the 3D information of the object may be acquired according to the second target attitude and position and the second target 3D model. The 3D information may include the depth information of the object, the attitude (including rotation angles and translation parameters) of the second target 3D model, and the corresponding 2D and 3D bounding boxes.

In some embodiments of the present disclosure, due to factors such as illumination or occlusion, the object in the 2D image may have fewer observable 2D key points (or the 2D key points are distributed on one face of the object), since there are many parameters to be solved, and directly using algorithms such as PnP may cause the matching to fail. In an embodiment of the present disclosure, an object that is closest to the object to be solved and has more observable 2D key points is found and set as the reference object, the ground normal parameter and the height of the ground is solved according to the attitude and position of the reference object, and then according to the constraint of the ground parameter, the number of attitude and position parameters to be solved may be reduced. Moreover, based on parameters of the reference object, the current space may be gridded, the initial value of the optimization method such as the least square may be set, and the attitude relation between the current 2D image object and the 3D model is estimated, and then the 3D information of the 2D object is obtained.

Figure 5:
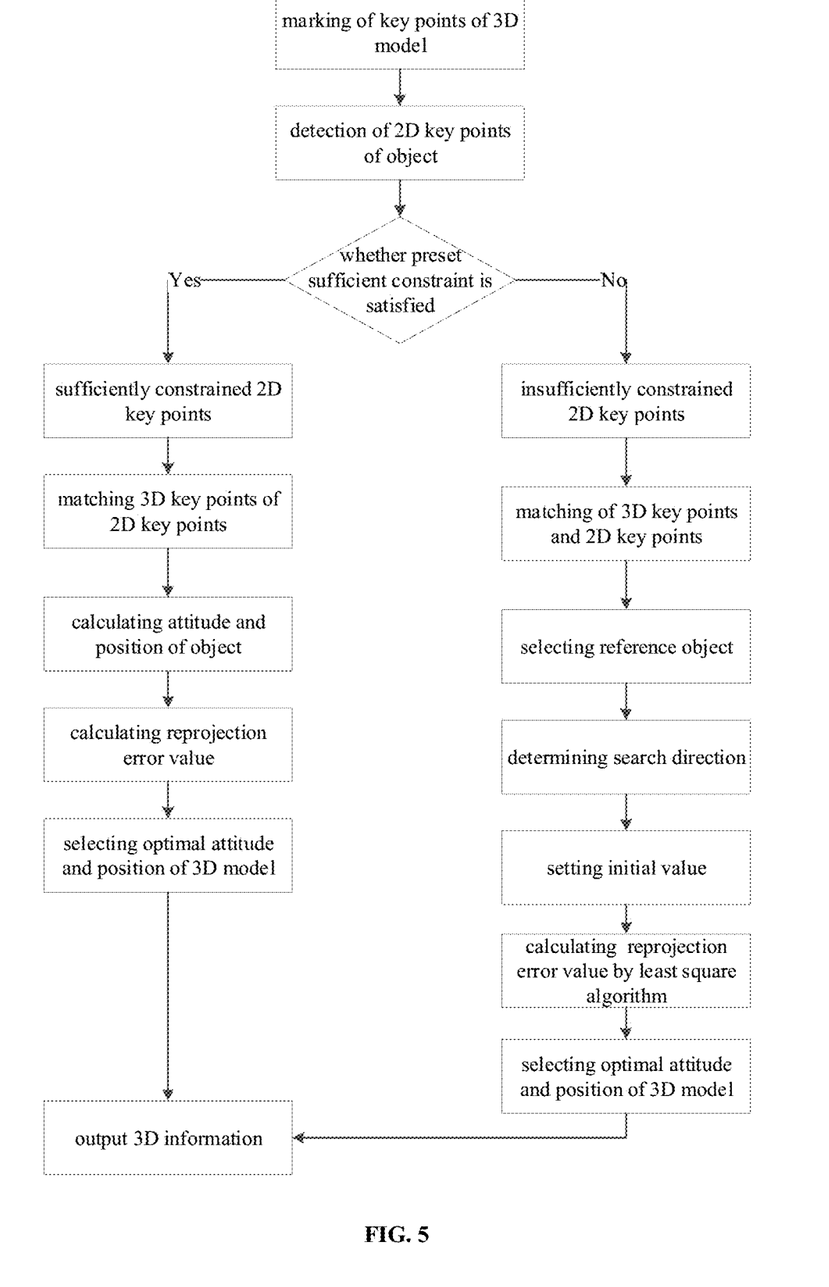
FIG. 5 is a flowchart of a method for acquiring 3D information of an object according to some embodiments of the present disclosure.

In the present disclosure, even when the 2D object has fewer observable 2D key points (or the 2D key points are distributed on one face of one object), the attitude relation between the 2D object and the 3D model can be obtained, thereby improving the robustness and accuracy of acquiring 3D information. With the method for acquiring the 3D information of the object according to embodiments of the present disclosure, as illustrated in FIG. 5, which is a flowchart of a method for acquiring 3D information of an object according to some embodiments of the present disclosure, the key points of the 2D object in the image is detected by a key point detection algorithm, it is determined whether the 2D key points detected satisfy the preset sufficient constraint (such as determining whether the observable key points are distributed on two or more faces of the object). When the observable key points are distributed on two or more faces of the object, it is determined that the sufficient constraint is satisfied, and the relative position relationship between the 3D model and the 2D object can be solved based on the correspondence between the detected observable 2D key points and the corresponding 3D key points of the 3D model, and the 3D information of the 2D object can be obtained.

When the observable 2D key points of the object in the image are distributed on one face of the object, it is determined that the 2D object is not sufficiently constrained, and there may be multiple solutions, when the detected observable 2D key points and the corresponding 3D key points of the candidate 3D model are directly used to solve the attitude relation, a failure may be caused. In the present disclosure, the object closest to the object to be solved and has more observable 2D key points is found and set as the reference object, the ground normal parameter and the ground height (ground constraint information) are solved according to the attitude and position of the reference object, and then according to the ground constraint information, the number of attitude parameters to be solved may be reduced. Moreover, based on ground constraint information of the reference object, the current space may be gridded, the initial value of the optimization method such as the least square may be set, and the attitude relation between the current 2D image object and the 3D model may be solved, and the 3D information of the 2D object can be obtained. Thus, even when the 2D object has fewer observable 2D key points (or the 2D key points are distributed on one face of one object), the attitude relation between the 2D object and the 3D model can be obtained, thereby improving the robustness and accuracy of acquiring 3D information.

Figure 6:
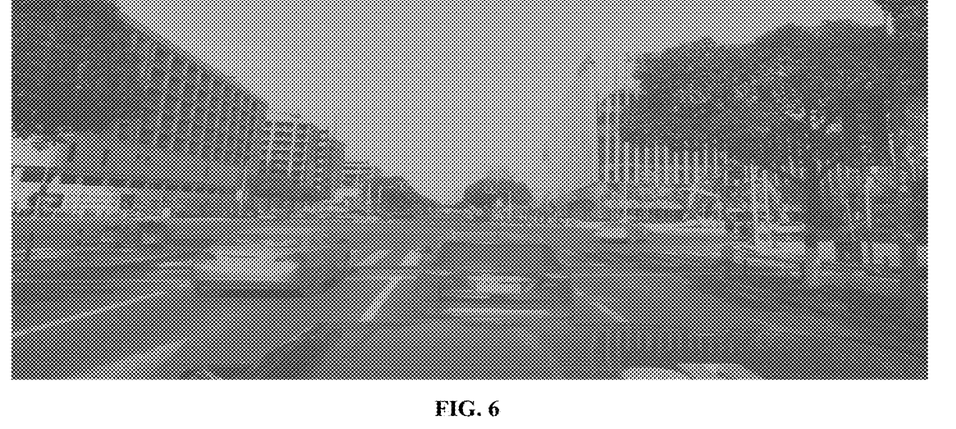
FIG. 6 is a schematic diagram of an effect of acquiring 3D information of an object according to some embodiments of the present disclosure.

FIG. 6 is a schematic diagram of an effect of acquiring 3D information of an object according to some embodiments of the present disclosure, as illustrated in FIG. 6, for a street view image, the corresponding 3D image can be obtained according to the 2D image of the street. When there are many objects whose 3D information needs to be acquired, in order to improve the rendering effect of 3D information, the 3D information of the sufficiently constrained object may be obtained first, and then the 3D information of the insufficiently constrained object is obtained.

With the method for acquiring 3D information of an object according to embodiments of the present disclosure, the image including the object to be recognized is acquired, 2D key points of the object are extracted based on the image, and the candidate 3D model set matching the image is determined. For each candidate 3D model in the candidate 3D model set, 3D key points matching the 2D key points are determined, and a plurality of first reference attitudes and positions of each candidate 3D model are determined according to the 3D key points and the 2D key points. Moreover, a plurality of reprojection error values between each candidate 3D model and the object at the plurality of first reference attitudes and positions are acquired, and a first reprojection error value set corresponding to the candidate 3D model set is determined, a first target attitude and position and a first target 3D model corresponding to the minimum reprojection error value in the first reprojection error value set is determined, and the 3D information of the object is determined based on the first target attitude and position and the first target 3D model. Thereby, the efficiency and accuracy of acquiring the 3D information of the object in the 2D image are improved, and the robustness of acquiring the 3D information of the object can be ensured.

Figure 7:
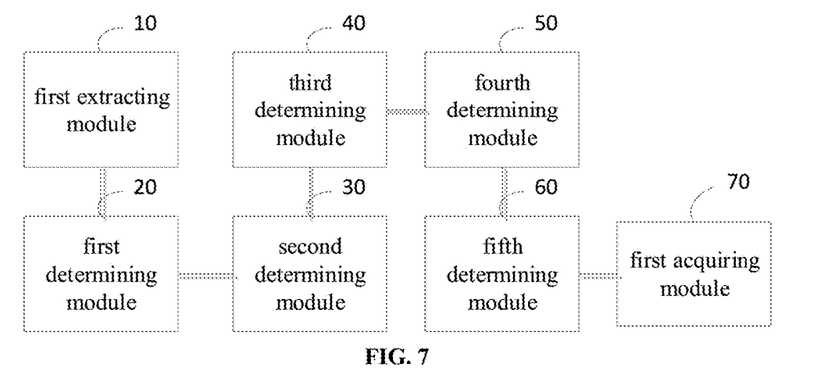
FIG. 7 is a block diagram of a device for acquiring 3D information of an object according to some embodiments of the present disclosure.

The present disclosure further provides a device for acquiring 3D information of an object. FIG. 7 is a block diagram of a device for acquiring 3D information of an object according to some embodiments of the present disclosure. As illustrated in FIG. 7, the device includes a first extracting module 10, a first determining module 20, a second determining module 30, a third determining module 40, a fourth determining module 50, a fifth determining module 60, and a first acquiring module 70.

The first extracting module 10 is configured to acquire an image including an object to be recognized, and extract 2D key points of the object based on the image. The first determining module 20 is configured to determine a candidate 3D model set matching the image. The second determining module 30 is configured to determine 3D key points matching the 2D key points for each candidate 3D model in the candidate 3D model set. The third determining module 40 is configured to determine a plurality of first reference attitudes and positions of each candidate 3D model according to the 3D key points and the 2D key points. The fourth determining module 50 is configured to acquire a plurality of reprojection error values between each candidate 3D model and the object at the plurality of first reference attitudes and positions, and determine a first reprojection error value set corresponding to the candidate 3D model set. The fifth determining module 60 is configured to determine a first target attitude and position and a first target 3D model corresponding to a minimum reprojection error value in the first reprojection error value set. The first acquiring module 70 is configured to acquire the 3D information of the object based on the first target attitude and position and the first target 3D model.

In some embodiments, the third determining module 40 is further configured to determine that the 2D key points satisfy a preset sufficient constraint.

In some embodiments, the third determining module 40 is further configured to determine that the 2D key points are on a same face of the object.

Figure 8:
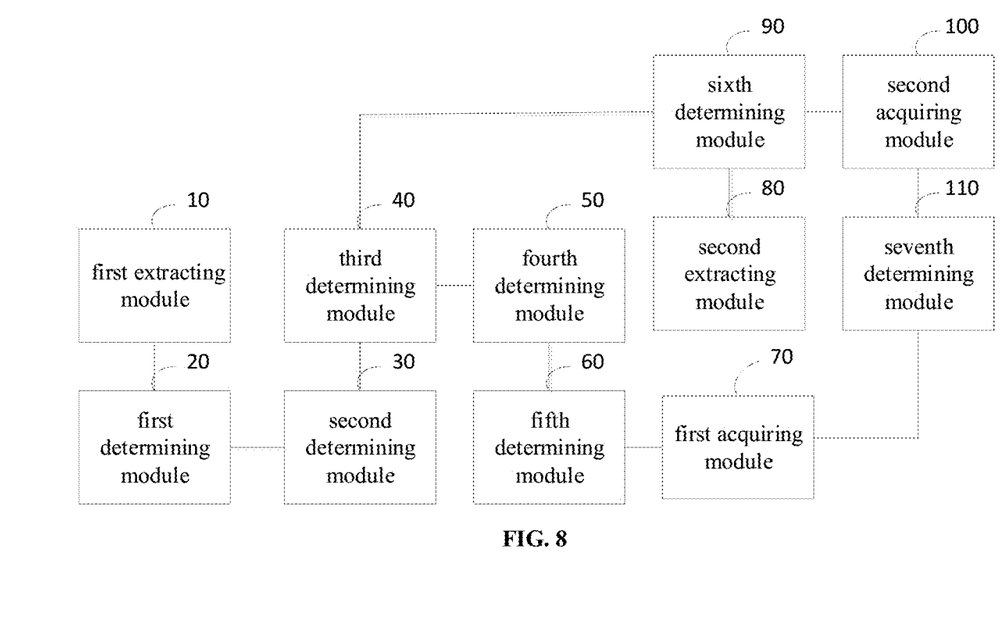
FIG. 8 is a block diagram of a device for acquiring 3D information of an object according to some embodiments of the present disclosure.

In an embodiment of the present disclosure, FIG. 8 is a block diagram of a device for acquiring 3D information of an object according to some embodiments of the present disclosure, as illustrated in FIG. 8, on the basis of FIG. 7, the device further includes a second extracting module 80, a sixth determining module 90, a second acquiring module 100, and a seventh determining module 110.

The second extracting module 80 is configured to extract a reference image of a reference object in the image according to a preset extraction strategy when determining that the 2D key points do not satisfy the preset sufficient constraint. The sixth determining module 90 is configured to determine ground constraint information of the object according to the reference image, and determine a plurality of second reference attitudes and positions of each candidate 3D model according to the ground constraint information, the 2D key points and the 3D key points of each candidate 3D model. The second acquiring module 100 is configured to acquire a plurality of reprojection error values between each candidate 3D model and the object at the plurality of second reference attitudes and positions. The seventh determining module 110 is configured to determine a second reprojection error value set corresponding to the candidate 3D model set, and determine a second target attitude and position and a second target 3D model corresponding to a minimum reprojection error value in the second reprojection error value set. The first acquiring module 70 is configured to acquire the 3D information of the object according to the second target attitude and position and the second target 3D model.

It should be noted that, the foregoing description of the embodiments of the method for acquiring the 3D information of the object may also be applicable to the device for acquiring the 3D information of the object of the embodiment, and details are not described herein again.

With the device for acquiring 3D information of an object according to embodiments of the present disclosure, the image including the object to be recognized is acquired, 2D key points of the object are extracted based on the image, and the candidate 3D model set matching the image is determined. For each candidate 3D model in the candidate 3D model set, 3D key points matching the 2D key points are determined, and a plurality of first reference attitudes and positions of each candidate 3D model are determined according to the 3D key points and the 2D key points. Moreover, a plurality of reprojection error values between each candidate 3D model and the object at the plurality of first reference attitudes and positions are acquired, and a first reprojection error value set corresponding to the candidate 3D model set is determined, a first target attitude and position and a first target 3D model corresponding to the minimum reprojection error value in the first reprojection error value set is determined, and the 3D information of the object is determined based on the first target attitude and position and the first target 3D model. Thereby, the efficiency and accuracy of acquiring the 3D information of the object in the 2D image are improved, and the robustness of acquiring the 3D information of the object can be ensured.

The present disclosure further provides a computer device including a memory, a processor, and a computer program stored on the memory and executable by the processor.

When the computer program is executed by the processor, the method of acquiring 3D information of the object according to the above embodiments of the present disclosure is implemented.

The present disclosure further provides a non-transitory computer readable storage medium having a computer program stored thereon. When the computer program is executed by a processor, the method for acquiring 3D information of an object according to the above embodiments of the present disclosure is implemented.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

In addition, terms such as "first" and "second" are used herein for purposes of description and are not intended to indicate or imply relative importance or significance or to imply the number of indicated technical features. Thus, the feature defined with "first" and "second" may explicitly or implicitly includes one or more of this feature. In the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for acquiring three-dimensional (3D) information of an object, comprising:
   acquiring an image comprising an object to be recognized, extracting two-dimensional (2D) key points of the object based on the image, and determining a candidate 3D model set matching the image;
   for each candidate 3D model in the candidate 3D model set, determining 3D key points matching the 2D key points, and determining a plurality of first reference attitudes and positions of each candidate 3D model according to the 3D key points and the 2D key points;
   acquiring a plurality of reprojection error values between each candidate 3D model and the object at the plurality of first reference attitudes and positions, and determining a first reprojection error value set corresponding to the candidate 3D model set;
   determining that the 2D key points satisfy a preset sufficient constraint, comprising: determining that the 2D key points are not on a same face of the object;
   determining a first target attitude and position and a first target 3D model corresponding to a minimum reprojection error value in the first reprojection error value set;
   acquiring the 3D information of the object based on the first target attitude and position and the first target 3D model;
   extracting a reference image of a reference object in the image according to a preset extraction strategy when determining that the 2D key points do not satisfy the preset sufficient constraint;
   determining ground constraint information of the object according to the reference image, and determining a plurality of second reference attitudes and positions of each candidate 3D model according to the ground constraint information, the 2D key points and the 3D key points of each candidate 3D model;
   acquiring a plurality of reprojection error values between each candidate 3D model and the object at the plurality of second reference attitudes and positions;
   determining a second reprojection error value set corresponding to the candidate 3D model set, and determining a second target attitude and position and a second target 3D model corresponding to a minimum reprojection error value in the second reprojection error value set; and
   acquiring the 3D information of the object according to the second target attitude and position and the second target 3D model.

2. The method according to claim 1, wherein extracting the reference image of the reference object in the image according to the preset extraction strategy when determining that the 2D key points do not satisfy the preset sufficient constraint comprises:

recognizing a candidate reference image of each of a plurality of candidate reference objects in the image when the 2D key points are on the same face of the object;

recognizing 2D key points of each of the plurality of candidate reference images; and     determining a candidate reference object whose 2D key points are not on the same face of the candidate reference object as the reference object.

3. The method according to claim 2, wherein when there are a plurality of reference objects, extracting the reference image of the reference object in the image comprises:

calculating an average value of 2D key points of each of the plurality of reference objects, to obtain a reference center point of each of the plurality of reference objects;

calculating an average value of 2D key points of the object, to obtain a center point of the object;

calculating an absolute value of a distance between the center point of the object and the reference center point of each of the plurality of reference objects, to obtain a plurality of absolute values;

comparing the plurality of absolute values, and determining a target reference object corresponding to a minimum absolute value, and     extracting the reference image corresponding to the target reference object.

4. The method according to claim 1, wherein determining the ground constraint information of the object according to the reference image, and determining the plurality of second reference attitudes and positions of each candidate 3D model according to the ground constraint information, the 2D key points and the 3D key points of each candidate 3D model comprises:

acquiring height data of the reference image in a vertical direction and horizontal attitude data of the reference image in a horizontal direction;

determining a plurality of horizontal attitude estimation data of the object according to a preset estimation algorithm and the horizontal attitude data;

determining a normal rotation angle corresponding to each of the plurality of horizontal attitude estimation data according to a correspondence between the 2D key points and the 3D key points of each candidate 3D model; and     determining the plurality of second reference attitudes and positions of each candidate 3D model according to the plurality of horizontal attitude estimation data and the normal rotation angle corresponding to each horizontal attitude estimation data.

5. The method according to claim 4, wherein determining the plurality of horizontal attitude estimation data of the object according to the preset estimation algorithm and the horizontal attitude data comprises:

acquiring first location information of the reference image and second location information of the image, and determining a search direction according to the first location information and the second location information; and     determining the plurality of horizontal attitude estimation data by taking the horizontal attitude data as an initial value, and performing an estimation along the search direction according to a least square algorithm.

6. The method according to claim 4, wherein acquiring the plurality of reprojection error values between each candidate 3D model and the object at the plurality of second reference attitudes and positions comprises:

determining the normal rotation angle of each candidate 3D model at each of the plurality of second reference attitudes and positions; and     acquiring the reprojection error value between each candidate 3D model and the object at the normal rotation angle.

7. A device for acquiring 3D information of an object, comprising:

a processor; and a memory, configured to store a computer program executable by the processor;

wherein when the computer program is executed by the processor, the processor is caused to:

acquire an image comprising an object to be recognized, and extract 2D key points of the object based on the image;

determine a candidate 3D model set matching the image;

determine 3D key points matching the 2D key points for each candidate 3D model in the candidate 3D model set;

determine a plurality of first reference attitudes and positions of each candidate 3D model according to the 3D key points and the 2D key points;

acquire a plurality of reprojection error values between each candidate 3D model and the object at the plurality of first reference attitudes and positions, and determine a first reprojection error value set corresponding to the candidate 3D model set;

determine that the 2D key points satisfy a preset sufficient constraint, comprising: determining that the 2D key points are not on a same face of the object;

determine a first target attitude and position and a first target 3D model corresponding to a minimum reprojection error value in the first reprojection error value set;

acquire the 3D information of the object based on the first target attitude and position and the first target 3D model;

extract a reference image of a reference object in the image according to a preset extraction strategy when determining that the 2D key points do not satisfy the preset sufficient constraint;

determine ground constraint information of the object according to the reference image, and determine a plurality of second reference attitudes and positions of each candidate 3D model according to the ground constraint information, the 2D key points and the 3D key points of each candidate 3D model;

acquire a plurality of reprojection error values between each candidate 3D model and the object at the plurality of second reference attitudes and positions;

determine a second reprojection error value set corresponding to the candidate 3D model set, and determine a second target attitude and position and a second target 3D model corresponding to a minimum reprojection error value in the second reprojection error value set; and     acquire the 3D information of the object according to the second target attitude and position and the second target 3D model.

8. The device according to claim 7, wherein the processor is further configured to:

recognize a candidate reference image of each of a plurality of candidate reference objects in the image when the 2D key points are on the same face of the object;

recognize 2D key points of each of the plurality of candidate reference images; and determine a candidate reference object whose 2D key points are not on the same face of the candidate reference object as the reference object.

9. The device according to claim 8, wherein the processor is further configured to:

calculate an average value of 2D key points of each of the plurality of reference objects, to obtain a reference center point of each of the plurality of reference objects;

calculate an average value of 2D key points of the object, to obtain a center point of the object;

calculate an absolute value of a distance between the center point of the object and the reference center point of each of the plurality of reference objects, to obtain a plurality of absolute values;

compare the plurality of absolute values, and determine a target reference object corresponding to a minimum absolute value, and extract the reference image corresponding to the target reference object.

10. The device according to claim 7, wherein the processor is further configured to:

acquire height data of the reference image in a vertical direction and horizontal attitude data of the reference image in a horizontal direction;

determine a plurality of horizontal attitude estimation data of the object according to a preset estimation algorithm and the horizontal attitude data;

determine a normal rotation angle corresponding to each of the plurality of horizontal attitude estimation data according to a correspondence between the 2D key points and the 3D key points of each candidate 3D model; and determine the plurality of second reference attitudes and positions of each candidate 3D model according to the plurality of horizontal attitude estimation data and the normal rotation angle corresponding to each horizontal attitude estimation data.

11. The device according to claim 10, wherein the processor is further configured to:

acquire first location information of the reference image and second location information of the image, and determine a search direction according to the first location information and the second location information; and determine the plurality of horizontal attitude estimation data by taking the horizontal attitude data as an initial value, and perform an estimation along the search direction according to a least square algorithm.

12. The device according to claim 10, wherein the processor is further configured to:

determine the normal rotation angle of each candidate 3D model at each of the plurality of second reference attitudes and positions; and acquire the reprojection error value between each candidate 3D model and the object at the normal rotation angle.

13. A non-transitory computer readable storage medium having stored thereon a computer program that, when executed by a processor, a method for acquiring 3D information of an object is implemented, the method comprising:

acquiring an image comprising an object to be recognized, extracting two-dimensional (2D) key points of the object based on the image, and determining a candidate 3D model set matching the image;

for each candidate 3D model in the candidate 3D model set, determining 3D key points matching the 2D key points, and determining a plurality of first reference attitudes and positions of each candidate 3D model according to the 3D key points and the 2D key points;

acquiring a plurality of reprojection error values between each candidate 3D model and the object at the plurality of first reference attitudes and positions, and determining a first reprojection error value set corresponding to the candidate 3D model set;

determining that the 2D key points satisfy a preset sufficient constraint, comprising: determining that the 2D key points are not on a same face of the object;

determining a first target attitude and position and a first target 3D model corresponding to a minimum reprojection error value in the first reprojection error value set;

acquiring the 3D information of the object based on the first target attitude and position and the first target 3D model;

extracting a reference image of a reference object in the image according to a preset extraction strategy when determining that the 2D key points do not satisfy the preset sufficient constraint;

determining ground constraint information of the object according to the reference image, and determining a plurality of second reference attitudes and positions of each candidate 3D model according to the ground constraint information, the 2D key points and the 3D key points of each candidate 3D model;

acquiring a plurality of reprojection error values between each candidate 3D model and the object at the plurality of second reference attitudes and positions;

determining a second reprojection error value set corresponding to the candidate 3D model set, and determining a second target attitude and position and a second target 3D model corresponding to a minimum reprojection error value in the second reprojection error value set; and acquiring the 3D information of the object according to the second target attitude and position and the second target 3D model.

* * * * *